United States Patent
Matsushima (10) Patent No.: US 10,427,298 B2
(45) Date of Patent: Oct. 1, 2019

(54) ROBOT SYSTEM DISPLAYING INFORMATION FOR TEACHING ROBOT

(71) Applicant: FANUC CORPORATION, Yamanashi (JP)

(72) Inventor: Tomonori Matsushima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/987,935

(22) Filed: May 24, 2018

(65) Prior Publication Data
US 2018/0345490 A1 Dec. 6, 2018

(30) Foreign Application Priority Data

May 31, 2017 (JP) .................................. 2017-108247

(51) Int. Cl.
| | |
|---|---|
| G05B 15/00 | (2006.01) |
| G05B 19/00 | (2006.01) |
| B25J 9/16 | (2006.01) |
| B25J 9/12 | (2006.01) |
| G06T 19/00 | (2011.01) |
| B25J 13/06 | (2006.01) |

(52) U.S. Cl.
CPC .................. *B25J 9/161* (2013.01); *B25J 9/12* (2013.01); *B25J 9/1671* (2013.01); *B25J 9/1697* (2013.01); *B25J 13/06* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 5,047,916 A | 9/1991 | Kondo | |
| 5,687,295 A | 11/1997 | Kaihori et al. | |
| 7,957,838 B2 | 6/2011 | Poljen et al. | |
| 2016/0207198 A1 | 7/2016 | Willfor et al. | |

FOREIGN PATENT DOCUMENTS

| | | |
|---|---|---|
| JP | H07295625 A | 11/1995 |
| JP | 2009-226561 A | 10/2009 |
| JP | 2012-171024 A | 9/2012 |
| JP | 2012-218120 A | 11/2012 |
| JP | 2016-107379 A | 6/2016 |

*Primary Examiner* — Bhavesh V Amin
(74) *Attorney, Agent, or Firm* — Hauptman Ham, LLP (57) ABSTRACT

A robot system includes a robot controller, a teach pendant including an orthogonal jog operation section, and an information display device. The robot controller sets positions on a robot coordinate system through which a hand tip section of a robot can pass as sampling points, and notifies the information display device of the positions of the sampling points and determination result information of whether or not the sampling points are within a range of motion of the hand tip section, and whether or not the sampling points are in the vicinity of a singularity. The information display device generates a graphical image that visually distinguishes the portion of the range of motion of the hand tip section, the portion near the singularities, etc., using the positions of the sampling points and the determination result information, and overlays the graphical image on an image of the robot.

5 Claims, 6 Drawing Sheets

ROBOT SYSTEM DISPLAYING INFORMATION FOR TEACHING ROBOT

RELATED APPLICATIONS

The present application claims priority of Japanese Patent Application No. 2017-108247, filed on May 31, 2017, the disclosure of which is hereby incorporated by reference herein in its entirety.

BACKGROUND OF THE INVENTION

1. Field of the Invention

The present invention relates to a robot system which displays information for teaching a robot.

2. Description of the Related Art

When using an articulated robot for tasks in a production facility, an operator of the robot teaches the robot desired task operations by actually manipulating the robot using a teach pendant connected to a robot controller.

Robot teaching operations include, in most cases, moving the robot to desired positions while pressing keys specifying the robot movement direction located on the teach pendant, i.e., "jog operations". As main operation methods of jog operations, there are an orthogonal jog operation in which a hand tip section of a robot is moved in the X-axis, Y-axis or Z-axis direction of a rectangular coordinate system fixed to the robot, and an individual axis jog operation in which the robot is moved in the direction around an axis for each axis part of the robot. Since orthogonal jog operations are operations based on an orthogonal coordinate system, which is easily understood by humans, operators frequently perform robot teaching operations using the orthogonal jog operations.

Furthermore, conventionally, there has been proposed a technique for graphically displaying the content of a designated jog mode, for example, the jog feed direction, along with an image of the robot, on a display when the operator operates the teach pendant of the robot controller and specifies the jog mode (refer to, for example, Japanese Unexamined Patent Publication (Kokai) No. 7-295625).

SUMMARY OF THE INVENTION

In general, when a command position is generated by specifying the movement direction of the hand tip section of the robot in the aforementioned orthogonal jog operation, the rotation angle of each of the axis parts is calculated from the command position by inverse kinematics calculation, and based on the calculated value, the respective axis parts cooperatively operate so as to move the hand tip section of the robot to the command position. Thus, it is difficult to move the robot to a command position at which the solution of the inverse kinematics calculation cannot be obtained. For example, regarding a command position at which the robot posture is such that the rotation axes of two or more axis parts are aligned in a straight line, since it is not possible to uniquely determine the rotation angle of these axis parts, the robot cannot be moved to such a position. A position in which the robot cannot be controlled in this way is referred to as a singularity, and when performing robot teaching with orthogonal jog operations, it is necessary to move the hand tip section of the robot away from singularities and the vicinities thereof.

However, since the singularities depend on the mechanism of robot, the operator often cannot recognize when the posture of the robot is approaching a singularity, and regions determined to be in the vicinity of a singularity also depend on the position of the singularity. Thus, it is very difficult for the operator to discover a way to efficiently avoid singularities. In the method disclosed in the aforementioned Japanese Unexamined Patent Publication (Kokai) No. 7-295625, since only the jog feed direction is graphically displayed, during teaching of the robot, the operator cannot recognize the positions of the singularities.

Thus, a technique which allows an operator to easily recognize, in orthogonal jog operations, the movement direction of the hand tip section of the robot as well as the presence of singularities in the movement direction is desired.

According to an aspect of the disclosure, there is provided a robot system, comprising a robot controller that controls a robot, a teach pendant including an orthogonal jog operation section for manually operating the robot with respect to each direction or a resultant direction of three orthogonal axes of a robot coordinate system fixed to the robot, and an information display device that displays information for teaching the robot, the robot controller comprising:

a sampling point calculation section that calculates, at predetermined cycles, a plurality of positions on the robot coordinate system through which a hand tip section of the robot can pass in a movement direction specified by the orthogonal jog operation section and sets the plurality of points as sampling points, a determination section that performs a first determination process to determine whether or not each of the sampling points is within a range of motion of the hand tip section, and a second determination process to determine whether or not each of the sampling points is in a vicinity of a singularity of the robot, and a notification section that notifies the information display device of the positions of the sampling points and determination result information indicating results of the first determination process and the second determination process for the sampling points, the information display device comprising:

a camera that photographs the robot;

a display section that displays an image of the robot photographed by the camera; and a display processing section that generates, using the positions of the sampling points and the determination result information, a graphical image to show a linear trajectory passing through the sampling points, and to visually distinguish, in the linear trajectory, portions inside the range of motion of the hand tip section, portions outside the range of motion of the hand tip section, and portions near the singularity, and performs a process to overlay the graphical image on the image of the robot.

BRIEF DESCRIPTION OF THE DRAWINGS

The object, features, and advantages of the present invention will be further clarified by the detailed description of the embodiments with reference to the accompanying drawings. In the attached drawings.

DETAILED DESCRIPTION

The embodiments of the present invention will be described below with reference to the accompanying drawings. In the following drawings, the same components are given the same reference numerals. For ease of understanding, the scales of the drawings have been appropriately modified. Furthermore, the embodiments shown in the drawings are only examples for carrying out the present invention, and the present invention is not limited to the illustrated embodiments.

Figure 1:
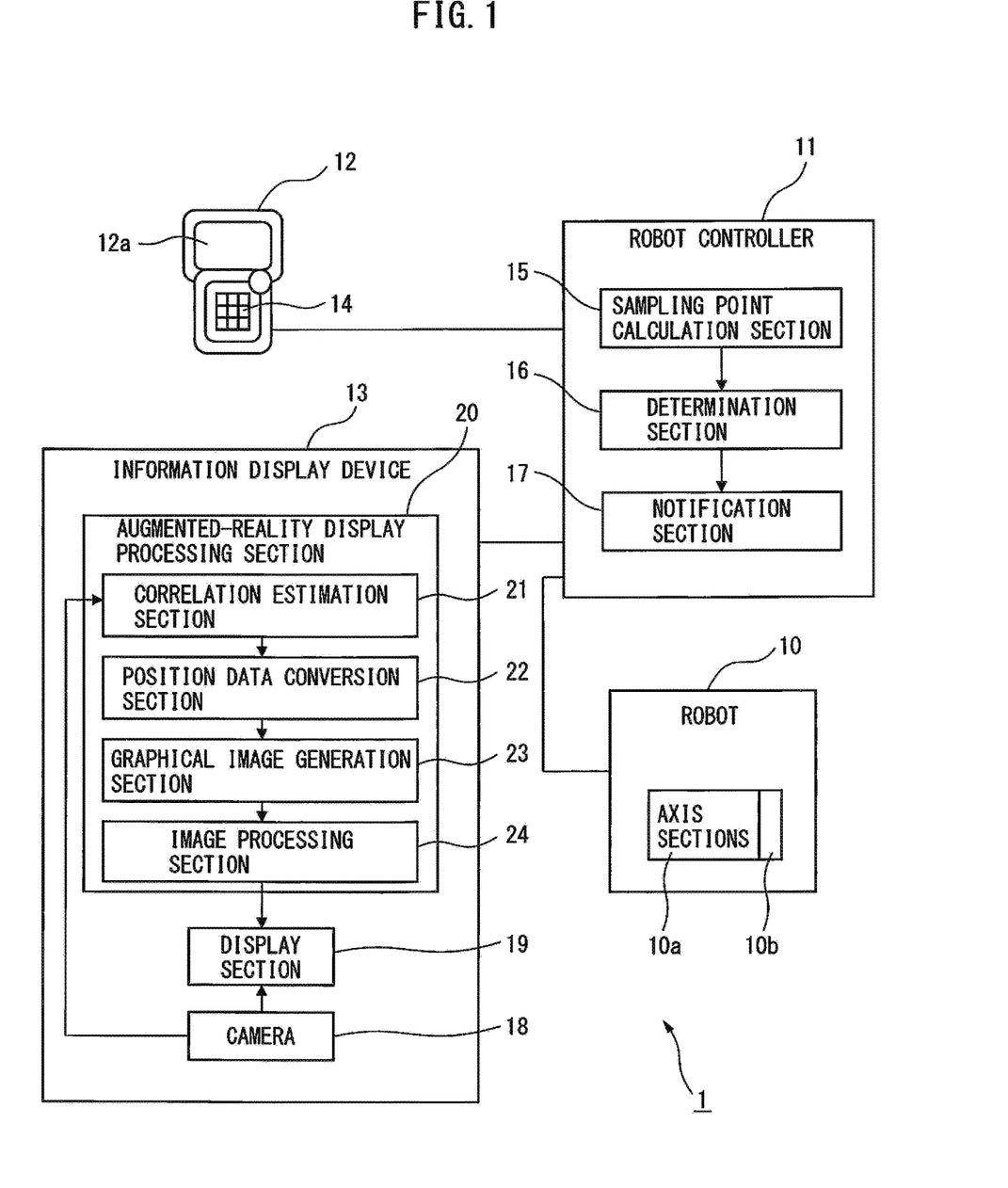
FIG. 1 is a function block diagram showing a robot system of an embodiment.

FIG. 1 is a function block diagram showing a robot system 1 according to an embodiment.

The robot system 1 of the present embodiment includes a robot controller 11 for controlling a robot 10, a teach pendant 12 for performing teaching operations of the robot 10, and an information display device 13 for displaying information related to the control of the robot 10.

Figure 2:
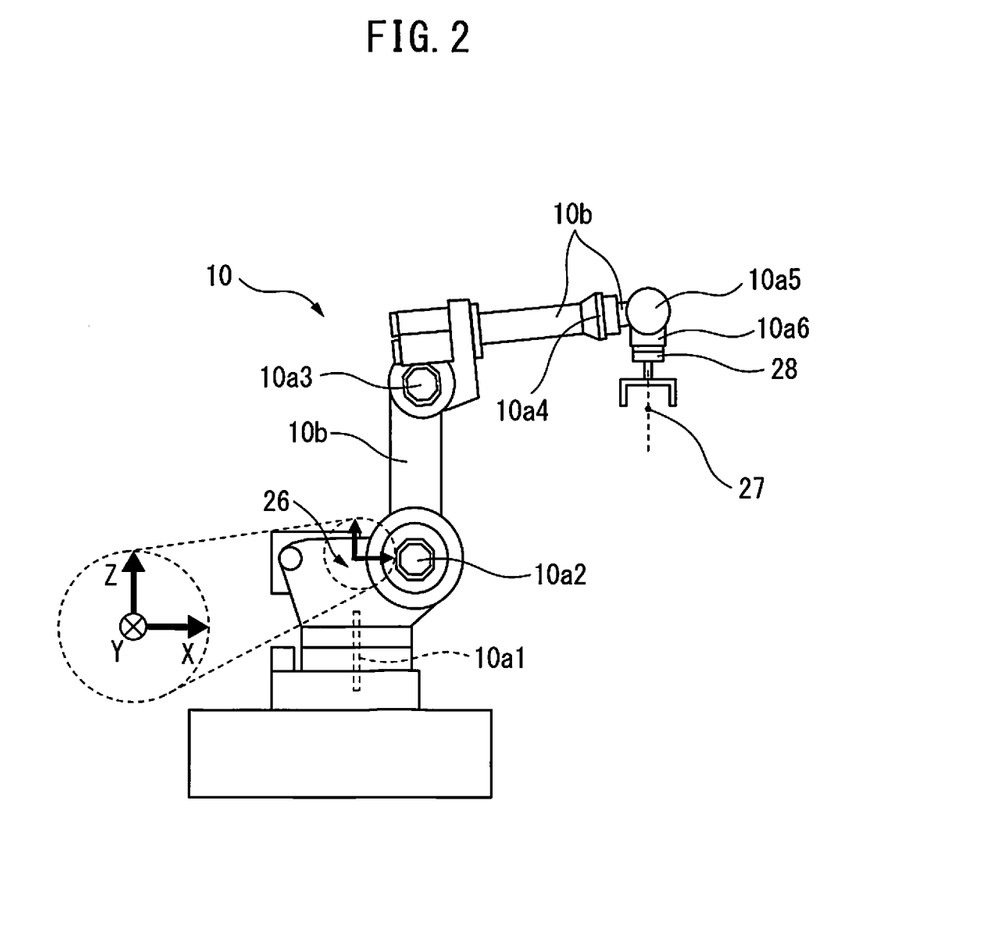
FIG. 2 is a side view showing a configuration example of a robot.

FIG. 2 is a side view showing a configuration example of the robot 10. The robot 10 shown in the drawing is a six-axis vertically articulated robot. As shown in FIG. 2, the robot 10 includes six axis sections 10a1 to 10a6 (joint sections), and a plurality of arm sections 10b (link sections) which are connected by the axis sections 10a1 to 10a6. A motor (not shown) is provided in each of the axis sections 10a1 to 10a6 to rotationally drive the arm sections 10b. Robot forms to which the present invention can be applied include articulated robots having a plurality of joint sections and are not limited to the robot form shown in FIG. 2.

Further, a robot coordinate system 26 is fixed to a body of the robot 10. In the present embodiment, the origin of the robot coordinate system 26 is provided at a base section of the robot 10. In FIG. 2, an enlarged view of the robot coordinate system 26 is indicated in a dashed circular frame. In the example of FIG. 2, the origin of the robot coordinate system 26 is provided at the base section of the robot 10, and the right direction in FIG. 2 is defined as the +X-axis direction, the upward direction in FIG. 2 is defined as the +Z-axis direction, and the depth direction with respect to a paper face of FIG. 2 is defined as the +Y-axis direction. The robot controller 11 and the teach pendant 12 can control the position of the hand tip section of the robot 10, for example, TCP 27 (tool center point), using positions (coordinates) in the aforementioned robot coordinate system 26.

Referring again to FIG. 1, the teach pendant 12 is wired or wirelessly connected to the robot controller 11 so as to enable mutual communication therebetween. The teach pendant 12 includes an orthogonal jog operation section 14 for manually operating the robot 10 with respect to the three orthogonal directions (the X-axis direction, Y-axis direction, and Z-axis direction) or a resultant direction in the robot coordinate system fixed to the robot 10.

In addition to the orthogonal jog operation section 14, the teach pendant 12 also includes individual axis jog operation sections, a tool jog operation section, etc. (not shown). The individual jog operation sections are operation sections for individually operating each of the axis sections 10a of the robot 10. The tool jog operation section is an operation section for manually operating the robot 10 based on a tool coordinate system fixed to a flange surface 28 (refer to FIG. 2) of the hand tip section of the robot 10, to which a tool can be attached. A hand section, a bolt fastener, a welding gun, or the like can be used as the tool.

The robot controller 11 generates an operation command for each axis section 10a of the robot 10 in accordance with an operation program stored in the robot controller 11 in advance and transmits the operation commands to the motor of each axis section 10a. The robot controller 11 also has the function of receiving the rotation angle and rotation speed of each axis section 10a of the robot 10.

The motor of each axis section 10a includes an encoder for detecting the rotation angle and rotation speed of the motor. The rotation angle and rotation speed of each axis section 10a is determined by the encoder included in the motor of each axis section 10a. The robot controller 11 controls the robot 10 so that the rotation angle and rotation speed output by the encoder coincide with the operation command (position command or speed command). Each axis section 10a may include, without being limited to an encoder, a measuring instrument capable of measuring the rotation position and rotation speed of the axis section 10a.

When teaching the robot 10 the desired task operations, the operator performs the teaching operations of the robot 10 using the teach pendant 12. For example, when the operator presses the +X-axis direction jog key on the orthogonal jog operation section 14 of the teach pendant 12, a processor (not shown) in the teach pendant 12 generates an operation command of the +X-axis direction corresponding to the pressed jog key and outputs the same to the robot controller 11. During teaching operations, the robot controller 11 controls the robot 10 in accordance with the operation commands input from the teach pendant 12.

Furthermore, by operating at least two jog keys from among the X-axis direction jog key, the Y-axis direction jog key, and the Z-axis direction jog key at the same time, the orthogonal jog operation section 14 of the present embodiment can move the robot 10 in a direction that combines the directions respectively corresponding to the at least two jog keys that were operated. For example, if the +X-axis direction jog key and the +Y-axis direction jog key are operated at the same time, the robot 10 moves in an oblique direction of 45 degrees in the XY plane.

The robot 10 has robot positions, so-called "singularities", at which the rotation angle and rotation speed of each axis section 10a of the robot 10 cannot be determined by inverse kinematics calculation from the movement command (position command or speed command) with respect to the hand tip section of the robot 10.

Figure 3A:
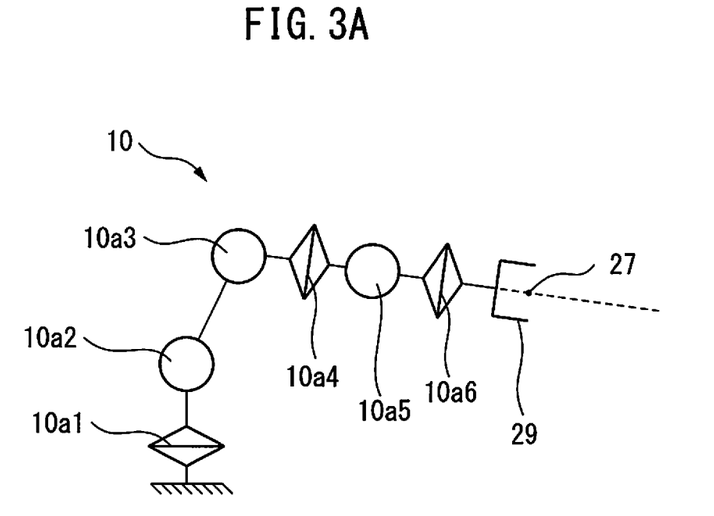
FIG. 3A is a schematic diagram showing an example of a singularity of an articulated robot.
Figure 3B:
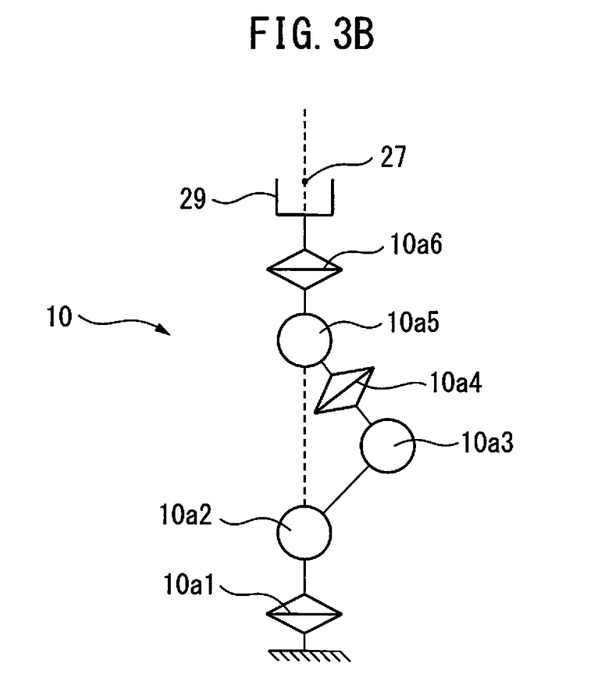
FIG. 3B is a schematic diagram showing another example of a singularity of an articulated robot.

For example, FIG. 3A and FIG. 3B are schematic diagrams showing examples of singularities of articulated robots. In these drawings, the axis sections 10a1 to 10a6 of the robot 10 shown in FIG. 2 are drawn schematically. As shown in FIG. 3A, when the posture of the robot is such that the center of rotation of the fourth axis section 10a4 and the center of rotation of the sixth axis section 10a6 are aligned on the same straight line, rotation of the tool 29 of the robot hand tip section can be performed by rotation of the fourth axis section 10a4 or can be performed by rotation of the sixth axis section 10a6. As shown in FIG. 3B, when the posture of the robot is such that the center of rotation of the first axis section 10a1 and the center of rotation of the sixth axis section 10a6 are aligned on the same straight line, rotation of the tool 29 of the robot hand tip section can be performed by rotation of the first axis section 10a or can be performed by rotation of the sixth axis section 10a6. Therefore, the rotation angle of each axis section 10a cannot be uniquely determined by inverse kinematics calculation with respect to the target position of the TCP 27 when the robot is in the posture shown in FIG. 3A or FIG. 3B. Thus, there are cases where the robot 10 may become uncontrollable when the TCP 27 is moved to a three-dimensional position where the center of rotation of two or more axis sections of the robot 10 are aligned on the same straight line or in the vicinity thereof.

Thus, in the present embodiment, the robot controller 11 and the information display device 13 include the following functional sections so that the operator can easily recognize, during the orthogonal jog operations, that the posture of the robot is approaching the aforementioned singularity or the vicinity thereof.

As shown in FIG. 1, the robot controller 11 includes a sampling point calculation section 15, a determination section 16, and a notification section 17.

Specifically, the sampling point calculation section 15 has the function of calculating a plurality of positions through which the hand tip section (for example, the TCP 27) of the robot 10 can pass in the movement direction (for example, the +X-axis direction, a resultant direction of the +X-axis direction and the +Y-axis direction, etc.) specified by the orthogonal jog operation section 14, and the function of setting such positions as sampling points. The plurality of calculated positions (sampling points) correspond to positions (coordinates) on the aforementioned robot coordinate system.

Specifically, the sampling point calculation section 15 calculates the current position of the hand tip section (for example, the TCP) of the robot 10 based on the rotation angle of each axis section 10a obtained from the output value of the encoder provided in each of the axis sections 10a of the robot 10. This current position can be obtained by forward kinematics calculation. The sampling point calculation section 15 calculates each of the aforementioned sampling points at predetermined cycles based on the obtained current position and the movement direction specified by the orthogonal jog operation section 14 (hereinafter referred to as the specified movement direction).

This predetermined cycle is a cycle much shorter than the generation cycle of the operation command of the robot 10 generated by robot teaching operations. As a result, each sampling point is calculated faster than the operation speed during teaching operations of the robot 10. Further, the predetermined cycle is set to a cycle at which each sampling point can be calculated at an interval shorter than a predetermined region for determining the vicinity of the singularity of the robot 10, which is described later.

The determination section 16 has the function of performing a first determination process to determine whether or not each of the calculated sampling points is within the range of motion of the hand tip section of the robot 10 and a second determination process to determine whether or not each of the calculated sampling points is in the vicinity of a singularity of the robot 10.

Regarding the aforementioned range of motion of the hand tip section of the robot 10, the range on the robot coordinate system through which the hand tip section of the robot 10 can move can be determined in advance using the dimensional data of the mechanical parts of the robot 10 when designing the robot, for example, the distances of the axis sections and the lengths of the arm sections. By storing such range of motion in a storage section (not shown) of the robot controller 11 in advance, the determination section 16 can determine whether or not the sampling points are within the range of motion of the hand tip section of the robot 10.

A singularity is a position of the hand tip section of the robot at which it is difficult to uniquely determine the rotation angle and rotation speed of each axis section 10a of the robot 10 from the movement command (position command or speed command) for the hand tip section of the robot 10. It is possible to determine whether or not the calculated sampling point is a singularity of the robot 10 by determining whether or not there is an axis section 10a for which it is difficult to obtain the solution of the inverse kinematics calculation with respect to the position of the sampling point. Further, it is possible to determine whether or not the sampling point is in the vicinity of the singularity of the robot 10 depending on whether or not there is an axis section 10a for which the motor cannot be controlled to the rotation angle corresponding to the solution even if the solution of the inverse kinematics calculation can be obtained.

In other words, the singularity of the robot referred to in this application corresponds to the position of the hand tip section of the robot where the solution of the inverse kinematics calculation cannot be obtained as described above. Further, the vicinity of the singularity of the robot referred to in this application corresponds to the position range of the hand tip section of the robot where there is an axis section for which the desired motor control cannot be performed even if the solution of the inverse kinematics calculation can be obtained.

The vicinity of the singularity described above can be determined by determining whether or not there are sampling points in the region obtained by adding a predetermined set range to the position of the hand tip section (position of the TCP) of the robot determined as a singularity of the robot.

The notification section 17 has the function to notify the information display device 13 of the position of each of the sampling points in the robot coordinate system and determination result information indicating the results of the first determination process and the second determination process for each of the sampling points. The information display device 13 is wired or wirelessly connected to the robot controller 11 so as to enable mutual communication therebetween.

As shown in FIG. 1, the information display device 13 includes a camera 18, a display section 19, and an augmented-reality display processing section 20.

The information displayed device 13 can be constituted, for example, by a camera-integrated head-mounted display device. The camera included in the head-mounted display device may be the camera 18, and the glasses-type display section arranged for the eyes of the user of the head-mounted display device may be the display section 19.

Specifically, the camera 18 photographs the robot 10 in the physical space, and the display section 19 displays the image of the robot 10 photographed by the camera 18.

The augmented-reality display processing section 20 can perform processing to generate a graphical image and overlay the same on the image of the robot displayed on the display section 19 using the positions of each of the sampling points and the determination result information notified from the notification section 17 of the robot controller 11. Such graphical image is generated so as to represent a linear trajectory passing through each of the sampling points, and to visually distinguish, on the liner trajectory, the portion inside the range of motion of the hand tip section of the robot 10, the portion outside the range of motion of the hand tip section, and the portions in the vicinity of singularities of the robot 10.

For example, the augmented-reality display processing section 20 can generate the graphic image so that the sampling points within the range of motion, the sampling points outside the range of motion, and the sampling points in the vicinity of a singularity are all shown as different colors or different shapes.

To describe in further detail, as shown in FIG. 1, the aforementioned augmented-reality display processing section 20 includes a correlation estimation section 21, a position data conversion section 22, a graphical image generation section 23, and an image processing section 24.

The correlation estimation section 21 has the function of estimating a correlation between the origin of the camera coordinate system fixed to the camera 18 and the origin of the robot coordinate system. For example, the correlation estimation section 21 calculates a coordinate transformation matrix to obtain the position of the origin and the orientation of the robot coordinate system viewed from the origin of the camera coordinate system. This is because even if the relative position and the relative angle of the camera 18 change with respect to the robot 10, it is necessary to overlay and display the graphical image in the appropriate orientation and position on the image of the robot 10 captured by the camera 18.

The position data conversion section 22 has the function to convert the positions of the sampling points notified from the notification section 17 into positions in the camera coordinate system using the correlation estimated by the correlation estimation section 21.

The graphical image generation section 23 has the function to generate the aforementioned graphical image using the positions of the sampling points in the camera coordinate system, and the determination result information for each of the sampling points notified from the notification section 17. In order to generate the aforementioned graphical image so as to match with the image of the robot 10, the graphical image generation section 23 uses the positions of each of the sampling points in the camera coordinate system.

The image processing section 24 has the function to perform processing so as to overlay the aforementioned graphical image on the image of the robot 10 displayed on the display section 19 based on the positions of each of the sampling points in the camera coordinate system.

Figure 4:
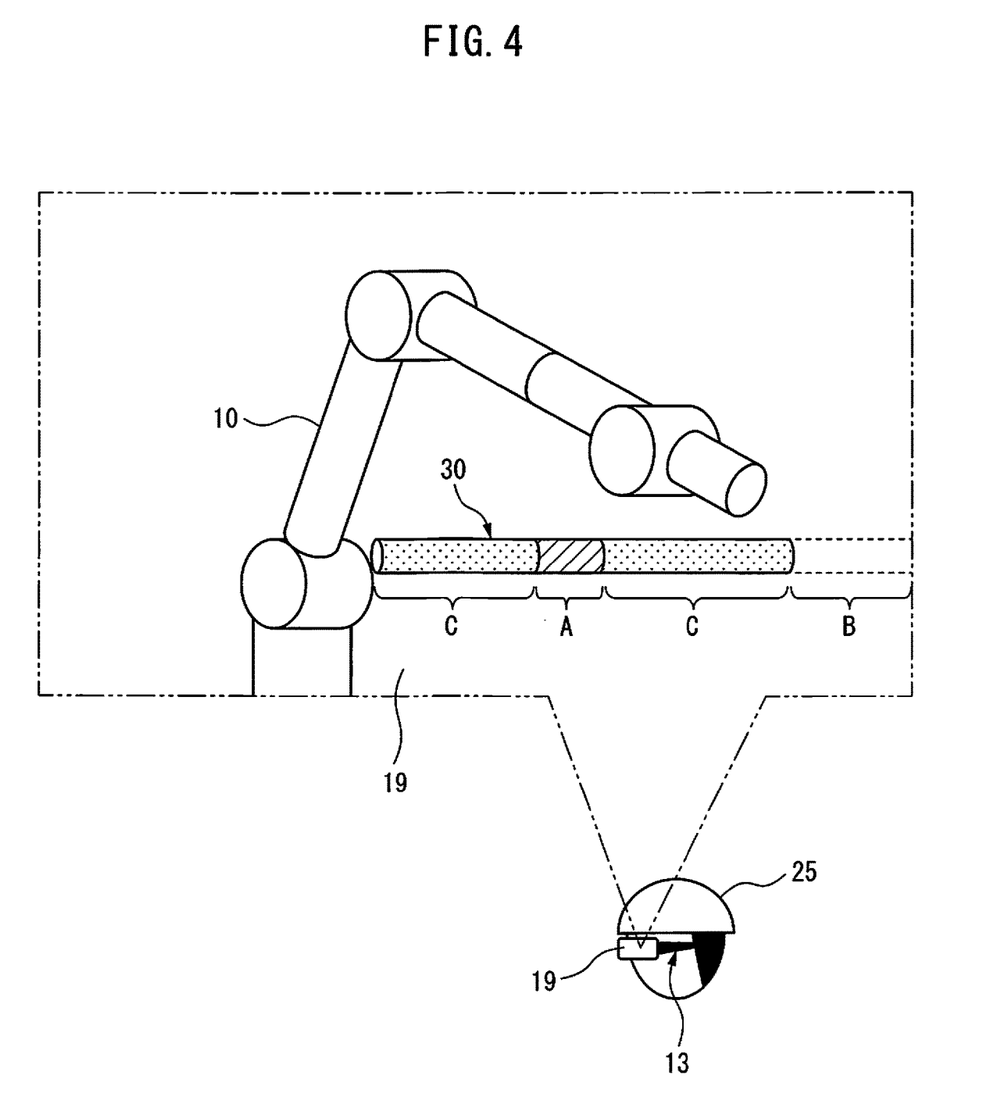
FIG. 4 is a view schematically illustrating an example of a graphical image overlaid on an image of a robot by the robot system of the embodiment.

FIG. 4 is a view schematically illustrating an example of a graphical image as described above overlaid on an image of the robot 10. As shown in FIG. 4, the operator 25 of the robot 10 wears the information display device 13 constituted by a camera-integrated head-mounted display device and can perform orthogonal jog operations using the teach pendant 12 while viewing the image of the robot 10 and the aforementioned graphical image on the display section 19 corresponding to the eyes. Furthermore, when moving the hand tip section of the robot 10 in a predetermined movement direction through orthogonal jog operations, the operator 25 of the robot 10 can easily recognize, from the display section 19, the vicinities of singularities in the movement direction through which the hand tip section of the robot cannot move and regions outside the range of motion.

For example, in the graphical image 30 shown in FIG. 4, the region of symbol A represents the vicinity of a singularity (the shaded area in the drawing), the region of symbol B represents the portion outside the range of motion (the blank area within the dashed frame in the drawing), and the region of symbol C (the dotted section in the drawing) represents the normal operating ranges. The regions of symbols A, B and C may be distinguished by different colors.

Furthermore, when the movement direction specified by the orthogonal jog operation section 14 is changed to another movement direction (for example, when changing from the +X-axis direction to the +Y-axis direction), the information display device 13 configured as described above can update the graphical image to be overlaid on an image of the robot 10 as described above in accordance with the changed direction.

Although the information display device 13 described above is constituted by a camera-integrated head-mounted display device, the information display device 13 may be realized in various forms.

For example, the information display device 13 may be incorporated in the teach pendant 12. In this case, the display panel 12a provided in the teach pendant 12 can be used as the display section 19 of the information display device 13. The display panel 12a of the teach pendant 12 has the function of displaying the image of the robot 10 photographed by the camera 18. Further, the augmented-reality display processing section 20 can overlay and display the aforementioned graphical image on the image of the robot 10 displayed on the display panel 12a.

The robot controller 11 and the information display device 13 described above may be constituted by a computer system including a storage section, a CPU (control processing unit), and a communication control section mutually connected through a bus. The storage section may be a memory device such as a ROM (read-only memory), a RAM (random access memory), an HDD (hard disk drive) or an SSD (solid-state drive). Furthermore, the functions of the sampling point calculation section 15, the determination section 16, and the notification section 17 included in the robot controller 11 as well as the functions of the correlation estimation section 21, the position data conversion section 22, the graphical image generation section 23, the image processing section 24, and the augmented-reality display processing section 20 included in the information display device 13 may be achieved through operations of the above CPU in cooperation with the above storage section.

Figure 5:
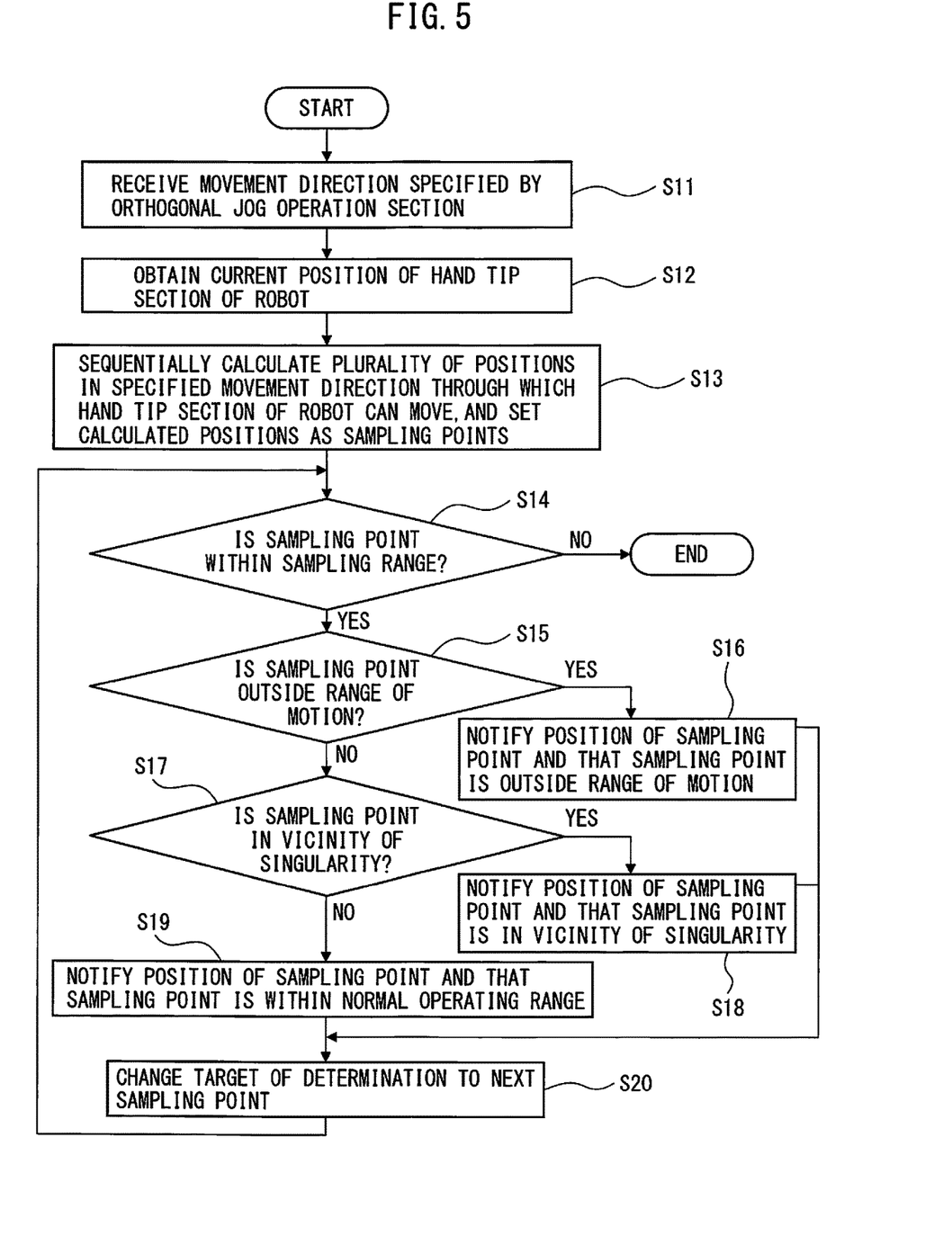
FIG. 5 is a flowchart showing the operation flow of the robot controller of FIG. 1.
Figure 6:
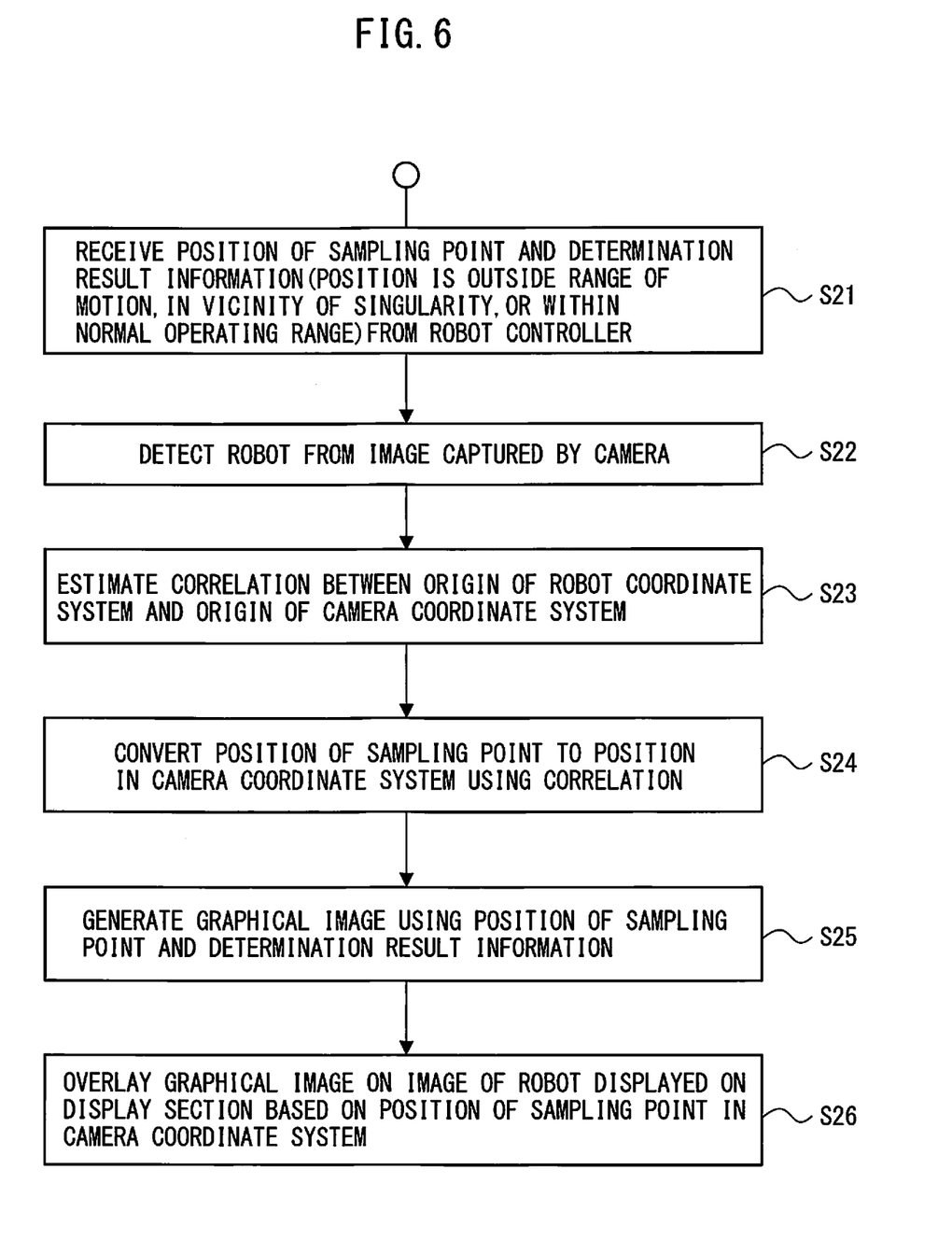
FIG. 6 is a flowchart showing the operation flow of the information display device of FIG. 1.

Next, the processing of the robot system 1 of the present embodiment will be described with reference to FIG. 5 and FIG. 6. FIG. 5 is a flowchart showing the operation flow of the robot controller 11 shown in FIG. 1 and FIG. 6 is a flowchart showing the operation flow of the information display device 13 shown in FIG. 1. It is assumed that, when step S11 of FIG. 5 is performed, the robot controller 11 is set to a teaching operation mode in which an individual manually performs operations of the robot using the teach pendant.

First, in step S11 of FIG. 5, the robot controller 11 receives the movement direction specified by the orthogonal jog operation section 14. Next, the robot controller 11 obtains the rotation angle of each of the axis sections 10a of the robot 10 from the output value of each encoder included in each axis section 10a. Next, in step S12, the robot controller 11 obtains the current position of the hand tip section (for example, the TCP) of the robot 10 from the rotation angle of each axis section 10 through forward kinematics calculation.

Next, in step S13, the sampling point calculation section 15 of the robot controller 11 sequentially calculates a plurality of positions on the robot coordinate system through which the hand tip section of the robot 10 can pass in the movement direction specified by the orthogonal jog operation section 14 and sets the calculated positions as sampling points. Since the current position of the hand tip section (for example, the TCP 27) of the robot 10 and the movement direction of the hand tip section specified in the jog operations are obtained, each of the above sampling points can be calculated at the above-mentioned predetermined cycles based on the current position and the movement direction.

Next, in step S14, the determination section 16 of the robot controller 11 determines whether or not a calculated sampling point is within a sampling range. When the sampling point is within the sampling range, step S15 is performed. When the sampling point is not within the sampling range, the process of the robot controller 11 ends.

The above sampling range is set, for example, as the interior of a rectangular parallelepiped that largely includes the range of motion of the robot 10 mounted on the floor. In this case, the coordinate values of the vertexes of the rectangular parallelepiped are numerically input from an input device connected to the robot controller 11, such as the teach pendant 12, or a computer device (not shown) and stored in the storage section of the robot controller 11. The coordinate values correspond to positions in the robot coordinate system. The shape of the sampling range is not limited to a rectangular parallelepiped.

In the above step S15, the determination section 16 determines whether or not the calculated sampling point is outside the range of motion of the hand tip section of the robot 10. The method for determining the range of motion is described above. When the sampling point is outside the range of motion, the notification section 17 of the robot controller 11 notifies the information display device 13 of determination result information which indicates that the sampling point is outside the range of motion together with the position of the sampling point (step S16), and step S20, which is described later, is performed. Conversely, when the sampling point is not outside the range of motion, step S17 is performed.

In the above-described step S17, the determination section 16 determines whether or not the calculated sampling point is in the vicinity of a singularity of the robot 10. The method for determining the vicinity of the singularity of the robot is as described above. When the sampling point is in the vicinity of a singularity, the notification section 17 notifies the display device 13 of determination result information indicating that the sampling point is in the vicinity of a singularity along with the position of the sampling point (step S18), and step S20, which is described later, is performed. Conversely, when the sampling point is not in the vicinity of a singularity, step S19 is performed.

In the above step S19, the notification section 17 notifies the information display device 13 of determination result information indicating that the sampling point is within a normal operating range along with the position of the sampling point.

Thereafter, in step S20, the robot controller 11 changes the target of processing of the determination section 16 to the next calculated sampling point, and again performs the processes of steps S14 to S19. If it is determined in step S14 that the sampling point is not within the sampling range, the process of the robot controller 11 ends.

As shown in FIG. 6, the information display device 13 receives the positions of the calculated sampling points and the determination result information for the sampling points (step S21). The received determination result information is the determination result obtained in each of the above step S16, step S18, and step S19 (refer to FIG. 5).

Next, in step S22, the information display device 13 obtains an image of the robot 10 photographed by the camera 18.

Next, in step S23, the correlation estimation section 21 of the information display device 13 estimates the correlation between the origin of the robot coordinate system fixed to the robot 10 and the origin of the camera coordinate system fixed to the camera 18.

For example, the correlation estimation section 21 calculates a coordinate transformation matrix for obtaining the position and orientation of the origin of the robot coordinate system seen from the origin of the camera coordinate system. At this time, for example, the robot 10 is detected from the image captured by the camera 10 based on features (the outline, corners, etc.) of the robot 10 and information on the current position of the robot 10 (position and posture information) is obtained from the output values of the encoders of the axis sections 10a. The correlation between the camera coordinate system and the robot coordinate system can be estimated based on the detected position of the robot 10 in the camera image system and the information of the current position of the robot 10.

Next, in step S24, the position data conversion section 22 of the information display device 13 converts the position of the sampling points notified from the notification section 17 into positions on the camera coordinate system based on the correlation estimated by the correlation estimation section 21.

Next, in step S25, the graphical image generation section 23 of the information display device 13 generates a graphical image using the position of the sampling points in the camera coordinate system and the determination result information. This graphical image is generated so as to represent the linear trajectory passing through the sampling points and so as to visually distinguish, in the linear trajectory, the portions within the range of motion of the hand tip section of the robot 10, the portions outside the range of motion of the hand tip section, and the portions in the vicinity of a singularity of the robot 10 (refer to, for example, the graphical image 30 shown in FIG. 4).

Next, in step S26, the image processing section 24 of the information display device 13 performs processing to overlay the aforementioned graphical image on the image of the robot 10 displayed on the display section 19 based on the positions of the sampling points in the camera coordinate system.

By performing the processes of step S21 through S26 described above, each time the position of the sampling point and the determination result information are received, the information display device 13 can overlay and display the graphical image corresponding to the determination result received for each sampling point on the image of the robot 10 displayed on the display section 19.

As described above, according to the robot system 1 of the present embodiment, when performing robot teaching using orthogonal jog operations, the movement direction of the hand tip section of the robot and singularities in the movement direction can be easily recognized by the operator.

Though the present invention has been described above, a person skilled in the art would understand that various modifications and changes can be made without departing from the scope of the claims, which are described later.

Furthermore, in order to solve the at least one problem of the present disclosure, various aspects and the effects thereof described below can be provided. In the following descriptions of the aspects, the numbers in parentheses correspond to the references numerals in the drawings of the present disclosure.

The first aspect of the present disclosure provides a robot system (1), comprising a robot controller (11) that controls a robot (10), a teach pendant (12) including an orthogonal jog operation section (14) for manually operating the robot (10) with respect to each direction or a resultant direction of three orthogonal axes of a robot coordinate system fixed to the robot, and an information display device (13) that displays information for teaching the robot (10), the robot controller (11) comprising:

a sampling point calculation section (15) that calculates, at predetermined cycles, a plurality of positions on the robot coordinate system through which a hand tip section of the robot can pass in a movement direction specified by the orthogonal jog operation section (14) and sets the plurality points as sampling points;

a determination section (16) that performs a first determination process to determine whether or not each of the sampling points is within a range of motion of the hand tip section, and a second determination process to determine whether or not each of the sampling points is in a vicinity of a singularity of the robot; and a notification section (17) that notifies the information display device (13) of the positions of the sampling points and determination result information indicating results of the first determination process and the second determination process for the sampling points, the information display device (13) comprising:

a camera (18) that photographs the robot (10);

a display section (19) that displays an image of the robot (10) photographed by the camera (18); and a display processing section (20) that generates, using the positions of the sampling points and the determination result information, a graphical image to show a linear trajectory passing through the sampling points, and to visually distinguish, in the linear trajectory, portions inside the range of motion of the hand tip section, portions outside the range of motion of the hand tip section, and portions near the singularity, and performs a process to overlay the graphical image on the image of the robot (10).

According to the above first aspect, when performing robot teaching using orthogonal jog operations, the operator can easily recognize the movement direction of hand tip section of the robot, and additionally can easily recognize if a singularity exists in the movement direction.

The second aspect of the present disclosure provides the robot system (1) of the above first aspect, wherein the display processing section (20) comprises:

a correlation estimation section (21) that estimates a correlation between an origin of a camera coordinate system attached to the camera (18) and an origin of the robot coordinate system;

a position data conversion section (22) that converts the positions of the sampling points to positions in the camera coordinate system using the correlation;

a graphical image generation section (23) that generates the graphical image using the positions of the sampling points in the camera coordinate system and the determination result information for the sampling points; and an image processing section (24) that performs a process to overlay the graphical image onto the image of the robot (10) based on the positions of the sampling points in the camera coordinate system.

According to the above second aspect, even if the relative position and relative angle of the camera changes with respect to the robot, it is possible to overlay and display the above graphical image on the image of the robot captured by the camera in an appropriate orientation and position.

The third aspect of the present disclosure provides the robot system (1) of the above first aspect or second aspect, wherein the information display device (13) is configured to update the graphical image overlaid on the image of the robot (10) in accordance with changes in the specified movement direction.

According to the above third aspect, even if the movement direction specified by the orthogonal jog operation section changes, the operator can easily recognize the changed specified movement direction and the position range in the vicinity of a singularity present in the movement direction.

The fourth aspect of the present disclosure provides the robot system (1) according to any of the above first aspect through the third aspect, wherein the information display device (13) is formed of a camera-integrated head-mounted display device.

According to the above fourth embodiment, during teaching of the robot, the operator can perform orthogonal jog operations with the teach pendant while wearing the information display device and visually recognizing the image of the robot and the above graphical image on the display section corresponding to the eyes.

The fifth aspect of the present disclosure provides the robot system (1) of the above first aspect through third aspect, wherein the information display device (13) is incorporated in the teach pendant (12), and the teach pendent (12) includes a display panel (12*a*) that displays the image of the robot (10) photographed by the camera (18), and the display processing section (20) overlays the graphical image on the image of the robot (10) displayed on the display panel (12*a*).

According to the above fifth aspect, during teaching of the robot, the operator can perform orthogonal jog operations while visually recognizing the graphic image on the display panel of the teach pendant.

The invention claimed is:

1. A robot system, comprising a robot controller that controls a robot, a teach pendant including an orthogonal jog operation section for manually operating the robot with respect to each direction or a resultant direction of three orthogonal axes of a robot coordinate system fixed to the robot, and an information display device that displays information for teaching the robot, the robot controller comprising:

a sampling point calculation section that calculates, at predetermined cycles, a plurality of positions on the robot coordinate system through which a hand tip section of the robot can pass in a movement direction specified by the orthogonal jog operation section and sets the plurality of positions as sampling points;

a determination section that performs a first determination process to determine whether or not each of the sampling points is within a range of motion of the hand tip section, and a second determination process to determine whether or not each of the sampling points is in a vicinity of a singularity of the robot; and a notification section that notifies the information display device of the positions of the sampling points and determination result information indicating results of the first determination process and the second determination process for the sampling points, the information display device comprising:

a camera that photographs the robot;

a display section that displays an image of the robot photographed by the camera; and a display processing section that generates, using the positions of the sampling points and the determination result information, a graphical image to show a linear trajectory passing through the sampling points, and to visually distinguish, in the linear trajectory, portions inside the range of motion of the hand tip section, portions outside the range of motion of the hand tip section, and portions near the singularity, and performs a process to overlay the graphical image on the image of the robot.

2. The robot system according to claim 1, wherein the display processing section comprises:

a correlation estimation section that estimates a correlation between an origin of a camera coordinate system attached to the camera and an origin of the robot coordinate system;

a position data conversion section that converts the positions of the sampling points to positions in the camera coordinate system using the correlation;

a graphical image generation section that generates the graphical image using the positions of the sampling points in the camera coordinate system and the determination result information for the sampling points; and an image processing section that performs a process to overlay the graphical image onto the image of the robot based on the positions of the sampling points in the camera coordinate system.

3. The robot system according to claim 1, wherein the information display device is configured to update the graphical image overlaid on the image of the robot in accordance with changes in the specified movement direction.

4. The robot system according to claim 1, wherein the information display device is formed of a camera-integrated head-mounted display device.

5. The robot system according to claim 1, wherein the information display device is incorporated in the teach pendant, and the teach pendent includes a display panel that displays the image of the robot photographed by the camera, and the display processing section overlays the graphical image on the image of the robot displayed on the display panel.

* * * * *